United States Patent [19]

Wheeler et al.

[11] Patent Number: 5,458,129
[45] Date of Patent: Oct. 17, 1995

[54] DOPPLER DEAD ZONE AVOIDANCE

[75] Inventors: Mark H. Wheeler, Pewaukee; Rowland F. Saunders, Hartland, both of Wis.

[73] Assignee: General Electric Company, Milwaukee, Wis.

[21] Appl. No.: 343,164

[22] Filed: Nov. 22, 1994

[51] Int. Cl.[6] ........................................... A61B 8/00
[52] U.S. Cl. ........................................... 128/661.08
[58] Field of Search .................. 128/660.06, 661.02, 128/661.07, 661.08, 661.09, 661.10, 662.01

[56] References Cited

U.S. PATENT DOCUMENTS 5,156,154 10/1992 Valenta, Jr. et al. ............... 128/661.09

*Primary Examiner*—George Manuel
*Attorney, Agent, or Firm*—B. Joan Haushalter; John H. Pilarski

[57] ABSTRACT

A doppler dead zone avoidance method is used in an ultrasound imaging apparatus to avoid the situation where time of flight equals PRI, or the time between doppler firings. Initially, range gate size and transmit parameters are optimized. This optimization of range gate size and transmit parameters is used to minimally adjust an operator selected velocity scale, as needed. Higher velocity scales can be achieved, based on optimization and minimization.

8 Claims, 3 Drawing Sheets

DOPPLER DEAD ZONE AVOIDANCE

TECHNICAL FIELD

The present invention relates to ultrasound imaging and, more particularly, to adjusting the timing or firing parameters to prevent overlap of echo and transmit signals in ultrasound imaging apparatus.

BACKGROUND ART

In doppler mode operation of an ultrasound imaging apparatus, the operator is able to place the target gate for the doppler vector at any point in the image. Additionally the operator is able to select any of the available velocity scales for the doppler firing and change the range gate size to any one of the selectable gate sizes. All these issues affect the timing of the transmit and receive for the doppler vector firings. This flexibility provides the operator with the ability to place the target gate in a location that would require the machine to transmit a doppler vector set at the same time it should be receiving a previous firing. This is referred to as a dead zone. Since the receive elements are the same as the transmit elements, this is not possible. This situation must be prevented, otherwise, no image is displayed when the operator is attempting to fire and receive at the same time.

In an effort to overcome this problem, ultrasound imaging systems have been developed which reduce the PRF. Other systems have been developed in which the range gate is decreased and the PRF is made large. Unfortunately, changing the PRF changes what the operator intentionally selected, affecting what the operator is trying to achieve. That is, changing the PRF means that the velocity the operator is looking for is now different from the actual velocity, which is problematic such as when the operator needs to display blood flow at a particular velocity setting.

It would be desirable then to have a means for adjusting the timing or firing parameters to prevent overlap which overcomes the problems associated with the prior art.

SUMMARY OF THE INVENTION

The present invention provides a means for adjusting the firing parameters to prevent overlap, using adjustments to transmit parameters, range gate size, and, finally, the PRF. The present invention provides the ultrasound imaging apparatus with the ability to come as close as possible to the operator selected, i.e., desired, PRF, while still avoiding dead zones.

In accordance with one aspect of the present invention, a doppler dead zone avoidance method is used in an ultrasound imaging apparatus to avoid the situation where time of flight equals PRI, or the time between doppler firings. Initially, range gate size and transmit parameters are optimized. This optimization of range gate size and transmit parameters is used to avoid adjusting the selected velocity scale, if possible, and, if not possible, then to minimally adjust the operator selected velocity scale. Higher velocity scales can be achieved, based on optimization and minimization.

Accordingly, it is an object of the present invention to prevent overlap of echo and transmit signals. It is a further object of the present invention to adjust the size of the dead zone to prevent the overlap. It is also an object of the present invention to use a range gate size adjustment to reduce the size of the dead zone and prevent overlap.

Other objects and advantages of the invention will be apparent from the following description, the accompanying drawings and the appended claims.

DETAILED DESCRIPTION OF THE PREFERRED EMBODIMENTS

Figure 1:
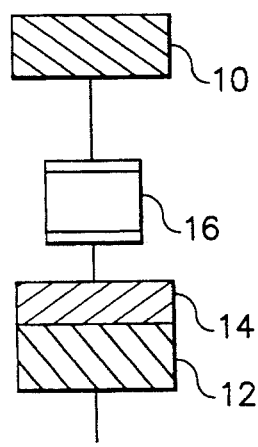
FIGS. 1, 2A, 2B, 3A, 3B, 4A, 4B, 5A, 5B, 6A, 6B, 7A, 7B, 8A, and 8B, are illustrative of the situations and resolutions, in accordance with the present invention, of overlap of range gate and dead zones.

The range gate width and PRI adjustments are used when the range gate overlaps a dead zone, i.e., when the location at which the transmit is focused overlaps a dead zone. The range gate size adjustments use the same range gate sizes which the operator can select. The amount of gate reduction required is at least the amount of range gate overlap into the dead zone.

The PRI adjustment, or the adjustment to the time between doppler firings, required to resolve the dilemma is also calculated for decision making purposes. The present invention allows for the maximization of the number of firings per the time period defined as the time between doppler firings. The analog delay calculated is assumed to be for the "old" burst length and the new range gate depth. The analog delay is defined as a delay after a firing to allow the signal to get far enough away to prevent feedback. The fifo length for the new vector needs to be available before the calculations begin.

Referring now to the drawings, in FIGS. 1, 2A, 2B, 3A, 3B, 4A, 4B, 5A, 5B, 6A, 6B, 7A, 7B, 8A, and 8B, a necessary initial transmit time is indicated in each Figure as block 10. A subsequent transmit time is indicated in each Figure as block 12. The subsequent transmit time 12 is equal to the transmit length plus the analog delay. Both initial and subsequent transmit times typically include the actual transmit time plus the extra time necessary to decrease saturation. Subsequent transmit times are preceded by a transmit parameter block 14. The range gate is indicated in each Figure as block 16.

In accordance with the present invention, several optional steps can be employed to adjust the size and location of the dead zone to prevent overlap of a transmit block 12 with a the range gate block 16. One step is to reduce the range gate size in an effort to prevent overlap of transmit and echo signals. If reduction of the range gate size does not achieve prevention of the overlap, or if reduction of the range gate size can be avoided altogether by employing the step of adjusting transmit parameters to minimize the dead zone, then that step is employed. This has the effect of maximizing the PRF. Alternatively, a third step can be employed in combination with or instead of one or both of the first two steps. The third step is to minimally change the PRI, as limited by predetermined database values.

Figure 2A:
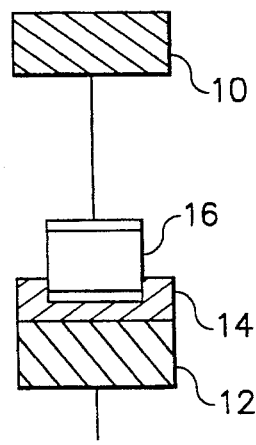
Figure 2B:
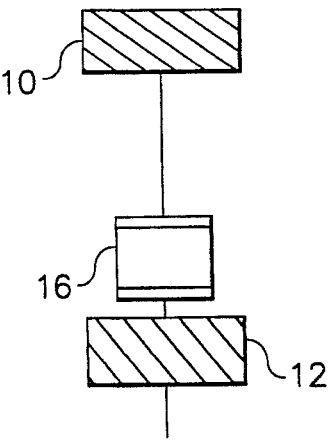
Figure 7A:
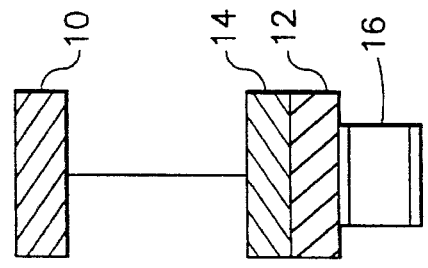
Figure 7B:
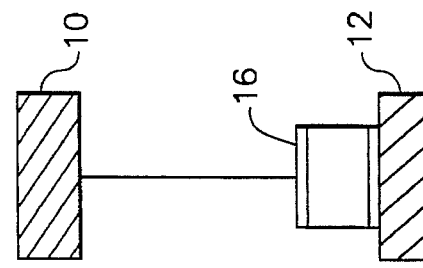
Figure 8A:
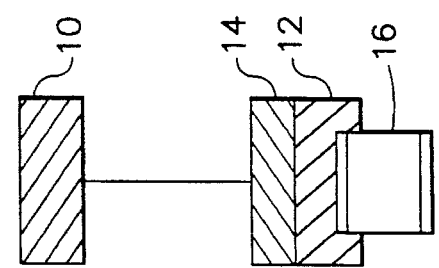
Figure 8B:
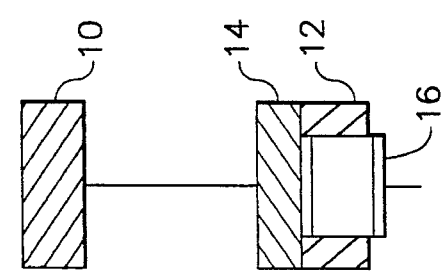

Referring still to FIGS. 1, 2A, 2B, 3A, 3B, 4A, 4B, 5A, 5B, 6A, 6B, 7A, 7B, 8A, and 8B, it is clear in FIG. 1 that no change is required, because the transmit block 12 does not overlap the range gate block 16. However, in FIG. 2A, the range gate block 16 overlaps the transmit parameter block 14. In considering the possible steps to employ in accordance with the present invention, it is clear that overlap is avoided by adjusting the transmit parameters of block 14 to minimize the dead zone. This is illustrated in FIG. 2B, wherein the transmit parameter block 14 has been minimized (i.e., deleted). In FIG. 8A, the range gate 16 overlaps the subsequent transmit 12. The PRI required to avoid the overlap is more than the PRI step size limit and the range gate is greater than the burst length. The PRI step size limit is determined by the velocity scales selected by the operator. It is undesirable to adjust the PRI step size limit, at least not by a value greater than the value of the previous velocity scale. Consequently, the range gate is reduced with no reduction in the burst length or analog delay. The PRI is not increased. Hence, the single step of reducing the range gate size to prevent the overlap is illustrated in FIG. 8B.

Figure 3A:
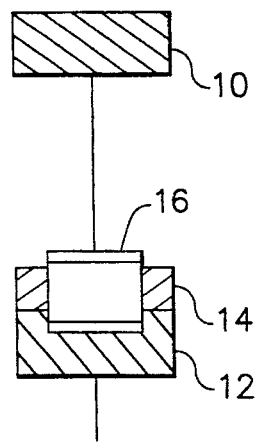
Figure 3B:
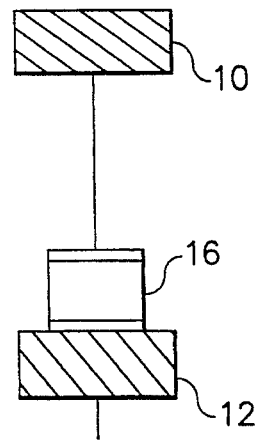
Figure 4A:
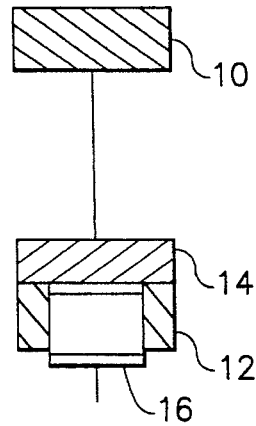
Figure 4B:
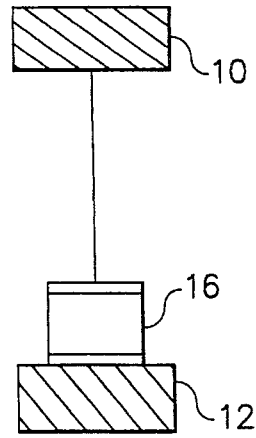
Figure 5A:
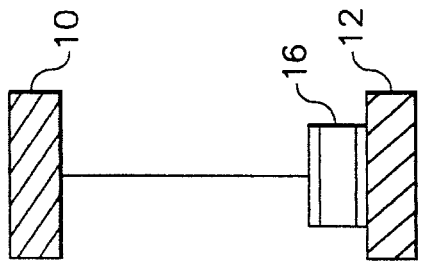
Figure 5B:
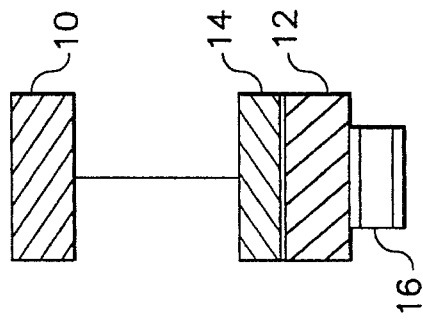

Employing one step only will not always achieve doppler dead zone avoidance. Therefore, the present invention provides the capability wherein the application of more than one step has the resultant desired effect of eliminating the overlap. This is illustrated, by way of example, in FIGS. 3A, 3B, 4A, 4B, 5A, 5B, 7A, and 7B. In FIG. 3A, the range gate 16 overlaps the transmit parameters block 14 and the subsequent transmit block 12. The overlap is eliminated in FIG. 3B by employing both the step of minimally increasing the PRI and the step of adjusting the transmit parameters. In FIG. 4A, the range gate 16 overlaps the subsequent transmit 12. Since the PRI required to avoid the overlap is less than the PRI step size limit, the overlap is again eliminated in FIG. 4B by employing both the step of minimally increasing the PRI and the step of adjusting the transmit parameters. In FIG. 5A, the range gate 16 overlaps the subsequent transmit 12. The PRI required to place the subsequent transmit 12 after the range gate 16 exceeds the PRI step size limit. The initial transmit 10 length equals the range gate 16 length. Consequently, the range gate and the burst length, i.e., transmit time, are reduced, resulting in a shorter analog delay. In FIG. 7A, the range gate 16 overlaps the subsequent transmit 12. The PRI required to avoid the overlap is more than the PRI step size limit. Since the range gate is greater than the subsequent transmit length, the range gate is reduced with no reduction in the subsequent transmit, and the PRI is minimally increased, as illustrated in FIG. 7B, to avoid the overlap.

Figure 6A:
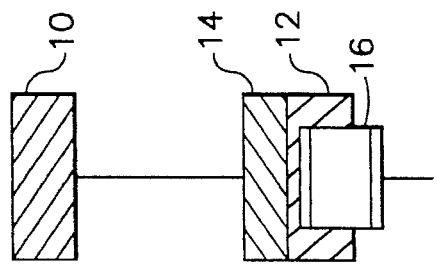
Figure 6B:
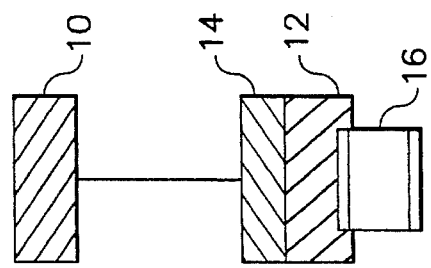

FIGS. 6A and 6B illustrate the situation where all three steps of the present invention are employed to achieve doppler dead zone avoidance. In FIG. 6A, the range gate 16 overlaps the subsequent transmit 12. The required PRI is greater than the step size limit. The initial transmit 10 length equals the range gate 16 and subsequent transmit 12 length. Consequently, as illustrated in FIG. 6B, the range gate 16, the initial transmit 10 length, and the subsequent transmit 12 length are reduced and the PRI is minimally increased, to put the subsequent transmit 12 after the range gate 16. In addition, the transmit parameters 14 are adjusted.

Figure 9:
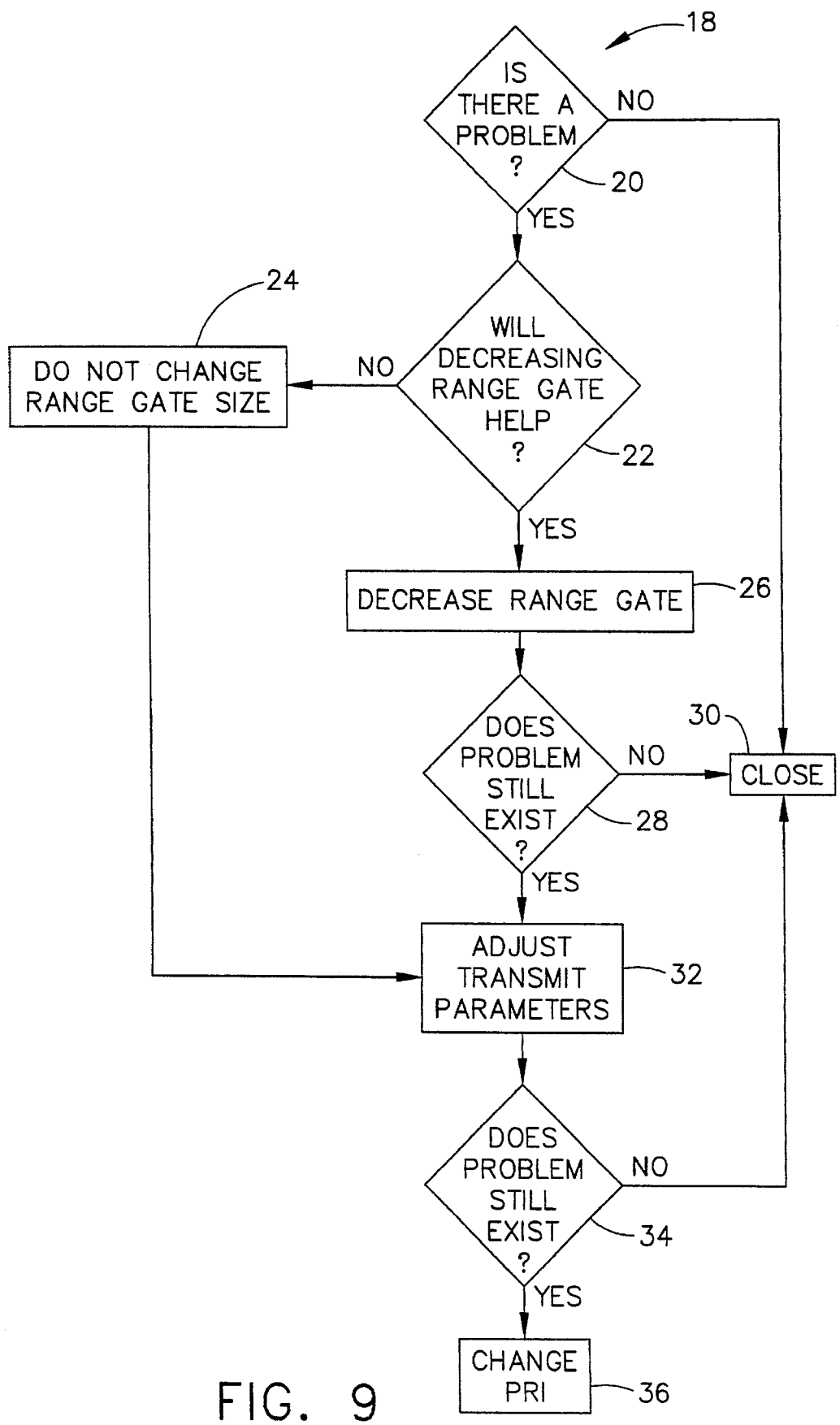
FIG. 9 is a flow chart diagram of the steps necessary to achieve the resolutions of FIGS. 2A, 3A, 4A, 5A, 6A, 7A, and 8A, as illustrated in FIGS. 2B, 3B, 4B, 5B, 6B, 7B, and 8B.

Referring now to FIG. 9, there is illustrated a flow chart diagram 18 of the steps necessary to achieve the resolutions of FIGS. 2A, 3A, 4A, 5A, 6A, 7A, and 8A, as illustrated in FIGS. 2B, 3B, 4B, 5B, 6B, 7B, and 8B. Initially, as indicated at block 20, it is determined whether a problem even exists. If not, the program proceeds directly to the close block 30. If a problem exists, the overlap is acknowledged, and the program proceeds to decision block 22. At decision block 22, it is determined if decreasing the size of range gate 16 will help eliminate the overlap. If not, the program proceeds to block 24, where the instruction is to not change the range gate, before the program continues to block 32.

If it is determined at decision block 22 that changing the rage gate size will have a desirable effect on reduction of the overlap, the size of the range gate is decreased, as indicated at block 26. Continuing with FIG. 9, the program then proceeds to block 28, to determine whether there is still an overlap. If not, the program closes at block 30. If so, the program proceeds to block 32 where the transmit parameters are adjusted. If this eliminates the overlap, as determined at decision block 34, the program closes at block 30. If there is still an overlap, the program proceeds to block 36, where the PRI is changed, typically by minimizing the size of the PRI.

In accordance with the present invention, the transmit burst length and PRI are set to operator selected values. The overlap of the range gate and analog delay is then calculated. If there is no overlap, then the fifo overlap is checked, to avoid overlap of transmit parameters 14 and range gate 16. If any overlap exists and the extended PRI is greater than the next operator selectable step size, then overlap may be alleviated by changing the range gate size. If the range gate is longer than the burst length, the range gate size and the mid processor sum time (i.e., the time required to receive and gather data, dependent on the size of the rage gate), are reduced until either there is no overlap with a PRI at the next selectable value, or the range gate size equals the burst length. The beam former does not care about the range gate size, only the burst length, i.e., transmit time. If there is no remaining overlap, the fifo is again checked, to assure that an overlap has not been created. If the range gate equals the burst length and there is overlap, the range gate size, burst length and mid processor sum time are reduced further. The effect on the analog delay is estimated to determine the existence of any overlap with a new range gate size. If the required transmit burst length is less than minimum, the transmit burst length is set to the minimum and the PRI is adjusted by the remaining overlap plus an additional amount, by rounding up.

If the PRI requires adjustment, this is accomplished by finding the integer number of PRIs which have passed by in the round trip travel time to the end of the range gate. The PRI is then extended by the value of (overlap time)/(integer number of PRIs), to avoid over-adjustment and to avoid running the previous range gate into a transmit signal.

The invention has been described in detail with particular reference to certain preferred embodiments thereof, but it will be understood that modifications and variations can be effected within the spirit and scope of the invention.

We claim:

1. A doppler dead zone avoidance method for an ultrasound imaging apparatus, comprising the steps of:

optimizing range gate size and transmit parameters;

using optimization of range gate size and transmit parameters to minimally adjust an operator selected velocity scale as needed;

achieving higher velocity scales based on optimization and minimization.

2. A doppler dead zone avoidance method as claimed in claim 1 further comprising the step of operating in real-time to achieve minimal adjustment to the operator selected velocity scale.

3. A doppler dead zone avoidance method as claimed in claim 1 wherein the step of optimizing the range gate size further comprises the step of reducing the range gate size by a range gate reduction amount to reduce range gate overlap amount into the dead zone.

4. A doppler dead zone avoidance method as claimed in claim 3 wherein the range gate reduction amount is at least as great as the range gate overlap amount.

5. A doppler dead zone avoidance method as claimed in claim 1 wherein the step of optimizing range gate size and transmit parameters further comprises the step of maximizing number of firings in a given time period.

6. A doppler dead zone avoidance method as claimed in claim 5 wherein the given time period is equal to a time between doppler firings.

7. A doppler dead zone avoidance method as claimed in claim 1 wherein the step of using optimization of range gate size and transmit parameters to minimally adjust an operator selected velocity scale as needed further comprises the step of determining if the velocity scale needed to avoid overlap is less than a velocity scale step size limit.

8. A doppler dead zone avoidance method as claimed in claim 1 further comprising the steps of:

determining if the optimization and minimization created a resultant overlap between the range gate and the transmit parameters; and correcting any resultant overlap.

\* \* \* \* \*